(12) United States Patent
Pallett et al.

(10) Patent No.: US 7,302,897 B2
(45) Date of Patent: Dec. 4, 2007

(54) MSW DISPOSAL PROCESS AND APPARATUS USING GASIFICATION

(76) Inventors: Richard B. Pallett, 169 Connaught Crescent, Bolton, Ontario (CA) L7E 2S8; Warren Hyland, 3260 Basalt Ct., Superior, CO (US) 80027

( * ) Notice: Subject to any disclaimer, the term of this patent is extended or adjusted under 35 U.S.C. 154(b) by 0 days.

(21) Appl. No.: 10/862,498

(22) Filed: Jun. 7, 2004

(65) Prior Publication Data
US 2004/0221778 A1    Nov. 11, 2004

Related U.S. Application Data

(63) Continuation-in-part of application No. 10/279,248, filed on Oct. 24, 2002.

(60) Provisional application No. 60/336,372, filed on Oct. 24, 2001.

(51) Int. Cl.
*F23B 7/00* (2006.01)

(52) U.S. Cl. .................. 110/342; 110/344; 110/220; 110/222; 110/224; 110/346; 110/233

(58) Field of Classification Search ............... 110/224, 110/222, 218, 219, 220, 221, 233, 346, 347, 110/342, 234; 48/99, 111, 197 A
See application file for complete search history.

(56) References Cited

U.S. PATENT DOCUMENTS

| | | | |
|---|---|---|---|
| 3,159,353 A | 12/1964 | Atwater | 241/39 |
| 4,232,614 A | 11/1980 | Fitch et al. | 110/235 |
| 4,448,588 A * | 5/1984 | Cheng | 48/99 |
| 4,882,903 A | 11/1989 | Lowry Jr. et al. | 60/39.182 |
| 4,977,837 A * | 12/1990 | Roos et al. | 110/165 A |
| 5,337,964 A | 8/1994 | Buehlmann | 241/17 |
| 5,343,632 A | 9/1994 | Dinh | 34/507 |
| 5,357,881 A * | 10/1994 | Elcik et al. | 110/346 |
| 5,516,975 A | 5/1996 | Takazawa | 588/256 |
| 5,623,822 A | 4/1997 | Schuetzenduebel et al. | 60/39.182 |
| 5,862,762 A * | 1/1999 | Sekiguchi et al. | 110/346 |

FOREIGN PATENT DOCUMENTS

DE    19731010 A1    7/1997

* cited by examiner

*Primary Examiner*—Kenneth Rinehart
(74) *Attorney, Agent, or Firm*—David A. Greenlee

(57) ABSTRACT

A system for disposing of municipal solid waste provides commercially-available equipment that is modified to initially remove identifiable unwanted components from the waste, and then chop the waste into small pieces of a size suitable for handling, separation and combustion. The moisture content of the waste is reduced in a closed system by passing dry air through the waste in a confined space to absorb moisture and produce moist air, which is then dehumidified via refrigeration equipment. The dehumidified air is recycled through the waste repeatedly through the closed system until the water content has reached the predetermined amount. The waste is stored in a bunker for later use or is immediately combusted in a two-step process by first gasifying the dried waste to produce combustible syngas and then immediately or later combusting the gas in a gas turbine or other engine to produce electricity that is partly used to power the process and partly sold commercially.

14 Claims, 6 Drawing Sheets

MSW DISPOSAL PROCESS AND APPARATUS USING GASIFICATION

CROSS REFERENCE TO RELATED APPLICATION

This application is a continuation-in-part of Utility patent application Ser. No. 10/279,248, filed Oct. 24, 2002, which claims priority of Provisional Patent Application Ser. No. 60/336,372, filed Oct. 24, 2001.

TECHNICAL FIELD

This invention relates to the disposal of municipal solid waste and, more particularly, to a pollution-free process and apparatus for disposing of municipal solid waste and generating energy.

BACKGROUND OF THE INVENTION

The disposal of municipal solid waste (MSW) presents an increasingly significant and difficult problem for municipalities to solve. As space for landfills diminishes and the permitting for such waste disposal has been eliminated, many schemes have been devised to otherwise utilize the waste as a fuel and generate electricity.

The composition of MSW can vary from locale to locale, but, on the average, has been found typically to be about 50% of combustible materials, such as wood, paper, plastic, food, yard waste and textiles, 5% metals, 10% glass, dirt and stones, and 35% water. The water content varies between 25% and 60% of the waste. To be an efficient fuel, the non-combustible content should be removed, along with the majority of the water. Sorting and magnetic separation can remove a majority of the unwanted components if the waste has been dried, but it is necessary to reduce the water content to 15% or below.

Many schemes have been devised to dewater the MSW, including heating, centrifugal separation, compression, anaerobic digestion etc. However, these schemes have proved to be extremely costly since they require a significant amount of time or energy just to dewater it sufficiently. The heating of wet MSW produces significant, unacceptable odors. As a result of these shortcomings, most MSW is not dried and the waste materials are not separated to improve the fuel value of the waste stream. Instead hundreds of so-called "trash-burning power plants" or incinerators have become economically untenable and hundreds more have not been able to meet the stringent air pollution standards that are prevalent in North America and Europe today.

More recently a process has been introduced which utilizes composting and aerobic techniques to dry the MSW, using closely controlled humidity and temperature. However, this process is so slow that several days are required to reduce the water content sufficiently to produce a high quality biomass fuel.

There is a need for a process and apparatus for disposing of MSW that provides for maximum recycle of useful constituents, removes the inert material and conditions the balance of organic matter (biomass) so that it can be used as a quality fuel to produce electricity or other useful energy in a cost-efficient and pollution-free manner.

SUMMARY OF THE INVENTION

It is therefore an object of this invention to provide a process and apparatus for disposing of MSW that provides for maximum recycle of useful constituents, removes the inert material and conditions the balance of organic matter (biomass) so that it can be used as a quality fuel to produce electricity or other useful energy in a cost-efficient and pollution-free manner.

While combusting raw MSW has proved to be not cost effective and presents pollution problems, and directly combusting dried and processed MSW has shown promise both ecologically and economically, it has recently been discovered that combusting the dried and processed MSW in a two-stage process eliminates the need for scrubbing the combustion gases of the direct combustion process and yields a near-100% improvement in efficiency. This two-step process comprises first gasifying the dried and processed MSW to produce combustible synthetic gas, or syngas (also known as producer gas), and then combusting the syngas at a high temperature, which combusts all the noxious and otherwise polluting products of combustion.

Many such systems for gasification have been developed over the past 25 years for combusting coal dust, chopped automobile parts, medical waste, organic materials such as wood chips and corn husks, and raw sewage, and are available from equipment suppliers such as Emery Energy Company, Ferco, DM2, Recovered Energy Inc. These systems have a wide-range of energy applications including: power (via reciprocating engines, gas turbines and fuel cells); production of hydrogen; and, production of liquid fuels and chemicals using a downstream syngas conversion processes.

In one aspect, this invention features a process and system of apparatus for disposing of municipal solid waste, comprising the steps of: removing identifiable unwanted components from the waste, chopping the waste into small pieces of a size suitable for handling and storage, reducing the moisture content of the waste to a predetermined amount in a closed system by passing dry air through the waste in a confined space to absorb moisture and produce moist air, dehumidifying the moist air until the water content has reached the predetermined amount, combusting the dewatered waste in a two-step process which gasifies the waste to produce a syngas, then combusting the syngas to produce energy in the form of heat to produce steam, or drive a combustion device or gas turbine to produce electricity, thereby eliminating any transfer of contaminants from the waste to the atmosphere during dewatering of the waste.

Preferably the dewatering step is accomplished by dehumidifying the moist air via a refrigeration cycle and recycling the dehumidified air through the waste repeatedly in a closed system until the water content has reached the predetermined amount, This invention also features a process and system for disposing of MSW and producing electricity or other useful energy which provides a heat exchanger for transferring heat from various stages of the gasification and electricity generation processes as a source of heat used in drying the MSW.

Preferably, MSW moisture content is reduced to 15% or some predetermined level that optimizes the process, and the syngas energy is used to generate electricity to preheat the dehumidifying air to enhance its ability to absorb moisture.

These and other objects and features of this invention will become more readily apparent upon reference to the following detailed description of preferred embodiments, as illustrated in the accompanying drawings, in which:

DESCRIPTION OF THE PREFERRED EMBODIMENT

Figure 1:
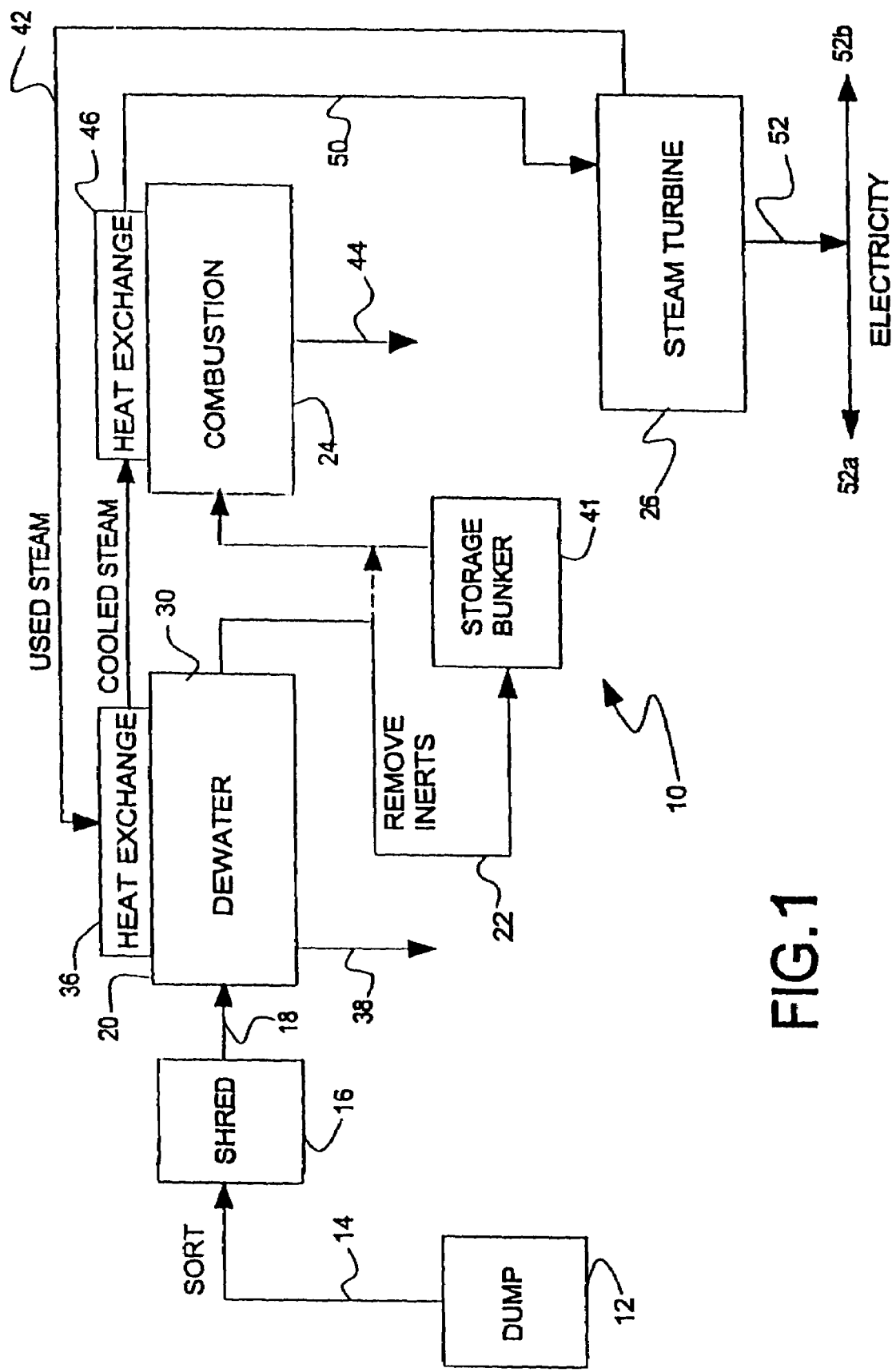
FIG. 1 is a simplified schematic depiction of one embodiment the MSW disposal process and system of this invention.
Figure 2:
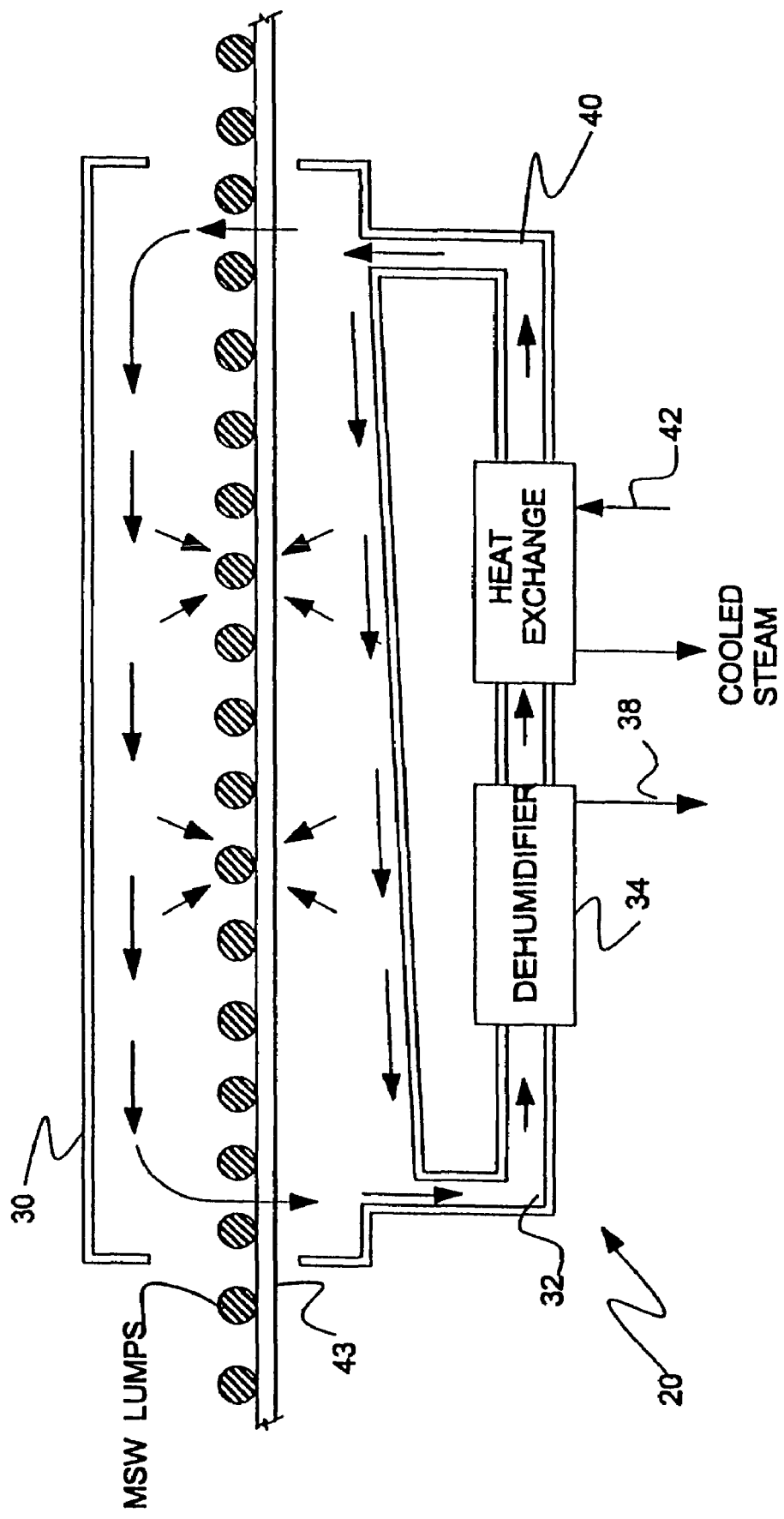
FIG. 2 is a schematic drawing of a commercially-available drying/dewatering system that can be adapted for use in the system of this invention.

As illustrated in FIG. 1, the MSW disposal system 10 of this invention comprises a dumping and sorting platform 12, a conveyor 14 connecting to a shredder or chopper 16, a conveyor 18 connecting to a dewatering chamber 20, a conveyor 22 connecting to a gasification chamber or vessel 24, and a steam or gas-powered electric generator or turbine 26. In operation, MSW is dumped onto sorting platform 12 and placed on a conveyor 14, where large, readily removable unwanted content is removed. The residue is then conveyed to chopper 16, where it is chopped into pieces that are less than 6 inches in diameter. Conveyors suitable for adaptation for use in this process are made by Machinex Recycling Conveyors, Pickering, Ontario, Canada. A portable version of shredding equipment suitable for adaptation for use in this system is made by SHRED-TECH, Cambridge, Ontario, Canada.

The chopped MSW is conveyed by conveyor 18 into the closed dewatering chamber 20, where warm, dry air is passed through the MSW, picks up moisture, and then exits in a closed system (no exposure to atmospheric air) to a refrigeration system that cools the air below the dew point to dehumidify the air. A commercially-available dewatering system that can be adapted for use in this system is illustrated in FIG. 3, and is made by Trane Corporation, Scarborough, Ontario, Canada.

Figure 3:
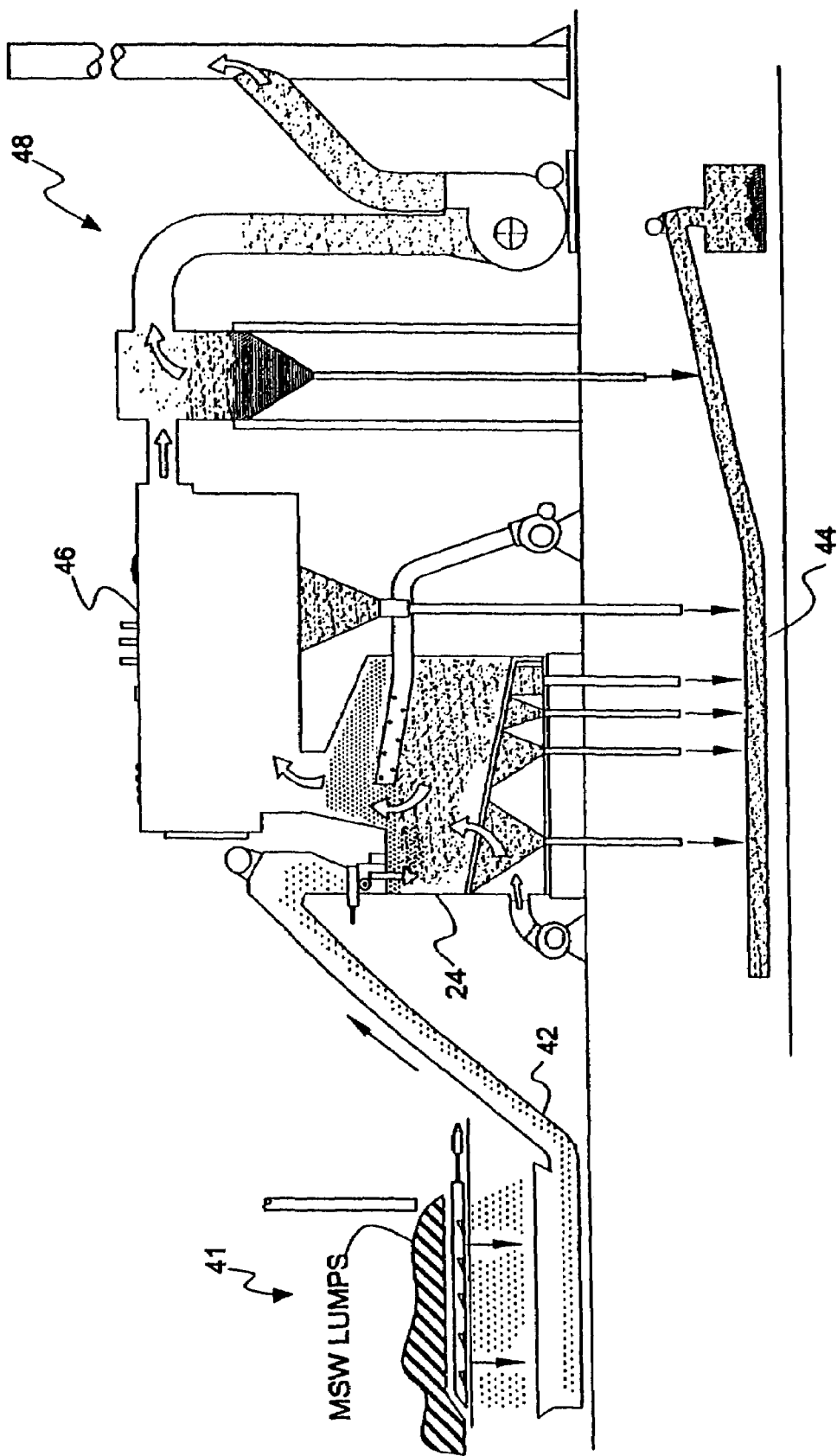
FIG. 3 is a schematic drawing of a commercially-available combustion system that can be adapted for use in one embodiment of MSW disposal system of this invention.

In FIG. 3, the MSW enters a closed chamber 30 where warm dry air is circulated to pick up moisture to dehumidify the waste. Moist air exits through duct 32 and enters a refrigeration/dehumidification unit 34, which drops the dew point and condenses the moisture, which is drained through pipe 38. The now-dry air exits unit 34 and returns to chamber 30 via duct 40 to further dehumidify the MSW. As shown in FIG. 1, a heat exchanger 36 is used to warm or preheat the dry air in duct 40 before it enters unit 34, thereby enhancing its ability to absorb moisture. Heat exchanger 36 is supplied with steam or hot water via pipe 42, as will be later described. The MSW traverses chamber 30 on a conveyor 43, the speed of which determined by the time needed for the MSW to reach a predetermined, desired moisture content (e.g. 10%).

The dewatered MSW is then sorted to remove the metal, glass and rocks. Another stage of shredding in then imposed on the waste stream to reduce the size to 2 inches in diameter or less depending upon the needs of the process used farther downstream. Conveyor 22 transports the material to a bunker 41 for storage for future use, or is immediately conveyed (dotted lines, FIG. 1) into a combustion chamber 24 (as shown), where it is combusted. Equipment for combustion of biomass, which can be adapted to burn the dewatered, conditioned MSW in this system, is illustrated in FIG. 3, and is made KMW, London, Ontario, Canada.

In FIG. 3, combustion chamber 24 is supplied with fuel by an automatic system 42 from bunker 41 or directly from conveyor 22. Ash or residue resulting from drops down and is handled by an automatic system 44. The heat of is used to produce steam in a boiler 46, while exhaust gasses resulting from combustion are disposed of by a fluegas system with any commercially-available emission control apparatus 48.

As seen in FIG. 1, this apparatus is adapted so that steam exiting the boiler/heat exchanger 46 is sent via pipe 50 to a steam or gas-powered electric turbine 26 to produce electric power in a power line 52 in a known manner. A portion of the electricity 52a is partially used to power the process, with the remainder 52b sold commercially and sent to the grid. A steam, gas or combined turbine suitable for adaptation to this system is made by TurboSteam, Tumers Falls, Mass. or the General Electric Corporation. After driving turbine 26, the used steam exits and is sent via pipe 42 to heat exchanger 36 to preheat the dried air in duct 36, as described above.

The residue from gasification of the dewatered MSW is now suitable for use as clean landfill. The process of dewatering the MSW by using a closed dehumidification system prevents any transfer of pollutants to the atmosphere during dewatering.

As described above, the equipment used in this system and process are modifications of the commercially-available equipment described above and shown in the accompanying drawings.

Figure 4:
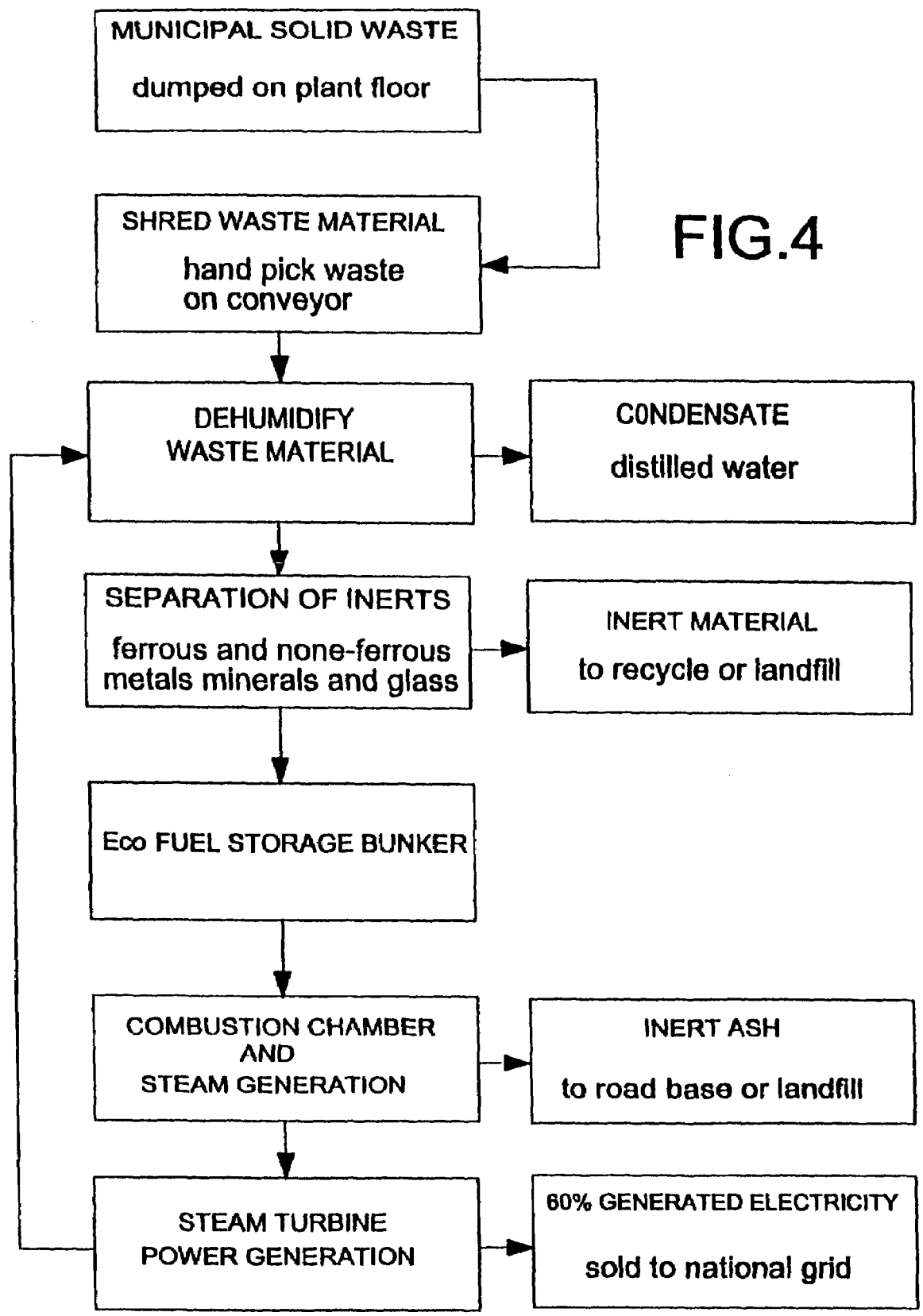
FIG. 4 is a process flow chart depicting the FIG. 1 embodiment of the process of this invention in greater detail.

FIG. 4 presents flow diagram of a specific preferred embodiment (in more detailed form than described above) of this process, as integrated into a single facility or plant, and can be segregated into the following discrete process segments:

Receiving and Storage

MSW is delivered by truck and/or rail and dumped onto the plant floor. It is then picked up by a front-loading truck and dumped into a hopper for distribution on a conveyor. A small crane or grapple is used to sort out and remove undesired materials which might damage the downstream shredding equipment.

Shredding

The conveyor then feeds the shredder, which chops or shreds the MSW into pieces having a maximum lump size of 6" (150 mm). A conveyor then feeds the shredded MSW to the dewatering, or dehumidifying, station.

Dewatering

Here the shredded MSW is conveyed slowly through the drying chamber where it is dehumidified for a period of time needed to dry the shredded MSW to a predetermined moisture content; here, in this example process, it is 5 hours. The refrigeration/dehumidification process produces condensed water that is sent to a water treatment plant for processing. When it exits the drying chamber, the MSW preferably has approximately a 15% or lower moisture content depending upon the requirements of their Gasifier that is installed downstream. Preferably, the MSW lumps will be tumbled or otherwise agitated to expose all surfaces to the warm moist air.

Separation of Inerts

The dried MSW exits the drying chamber on a conveyor and undergoes a process of separating out such inerts (inert material) as metals, minerals and glass, using established and proven separation technology. This inert material is then recycled or sent to a landfill. At this point in the process, the MSW has attained a 50% weight reduction, is shredded again to nominal size of 2" or less depending upon the requirements of the downstream Gasifier and has a calorific value of 15-18 MJ/kg. It is then sent to a fuel storage bunker to await removal for feeding the gasifier.

Combustion and Power Generation

When needed, this processed and dewatered MSW is fed to the gasifier at a controlled rate by any of several conventional means, where it is gasified to produce a fuel which in turn may be used in a gas turbine to generate electricity or otherwise converted to useful products. The inert slag (2%), which results from the gasification, can be used for landfill or as a road base. In this exemplary embodiment, some of the generated electricity (15%-20%) is used in the processing of the MSW, and the majority (80%-85%) is sold commercially.

Thus, this invention features a system comprising a system (apparatus) and a process for reducing the moisture content of MSW by continuously passing warm dry air through the waste in a closed chamber without appreciably heating the waste (only minimal heating of the MSW will occur by the preheated inlet air). Since moisture is removed by evaporation (i.e. absorbed by the dry warm air) and not by boiling, there is no need to heat the MSW to boil off the water, as in conventional "trash-burning power plants", resulting in a significant energy savings. This low process temperature, plus conducting the drying in a closed chamber, eliminate or drastically reduce the boiling off or other escape of pollutants into the surrounding atmosphere.

Embodiment Using Gasification of Dewatered MSW

While directly combusting dried and processed MSW, in accordance with the prior embodiment shown in FIGS. 1-4, has shown promise both ecologically and economically, it has recently been discovered that combusting the dried and processed MSW in a two-step process eliminates the need for scrubbing the combustion gases of the direct combustion process and yields a near-100% improvement in efficiency.

This two-step process is preferably a close-coupled process that comprises first gasifying the dried and processed MSW to produce synthetic gas, or syngas (also known as producer gas), and then combusting the syngas at a high temperature, which combusts all the noxious and otherwise polluting products of combustion. Although the syngas could be stored for later use, as in other process which gasify other materials, the close-coupled gasification process which immediately combusts the produced syngas, is preferred for efficiency through immediate generation of electricity, that is partially used in the process, and production of heat used to heat the air in the dewatering portion of the process.

Gasification techniques require fuels that are very uniform in quality, (size, composition, moisture content and non-combustible content); the dewatered MSW (or refuse-derived fuel) produced by this invention meets these criteria. Gasification is especially suited for fuels with high volatile content, as here.

Gasification consists of a first step of partial decomposition of the fuel (here, dewatered MSW) by heating in an oxygen-starved atmosphere (25%-40% of stoichiometric) into a low BTU gas (120-250 BTU/SCF) syngas and char (carbon and ash). The gasification reaction is stable at 600° C.-800° C. This is followed by a second step in which this syngas is combusted (in a gas turbine or internal combustion engine) with low excess air to produce energy in the form of steam or electricity or both. The char can be burned in the lower portion of the gasifier to produce the high temperature gases that provide the heat for the initial gasification step.

Figure 5:
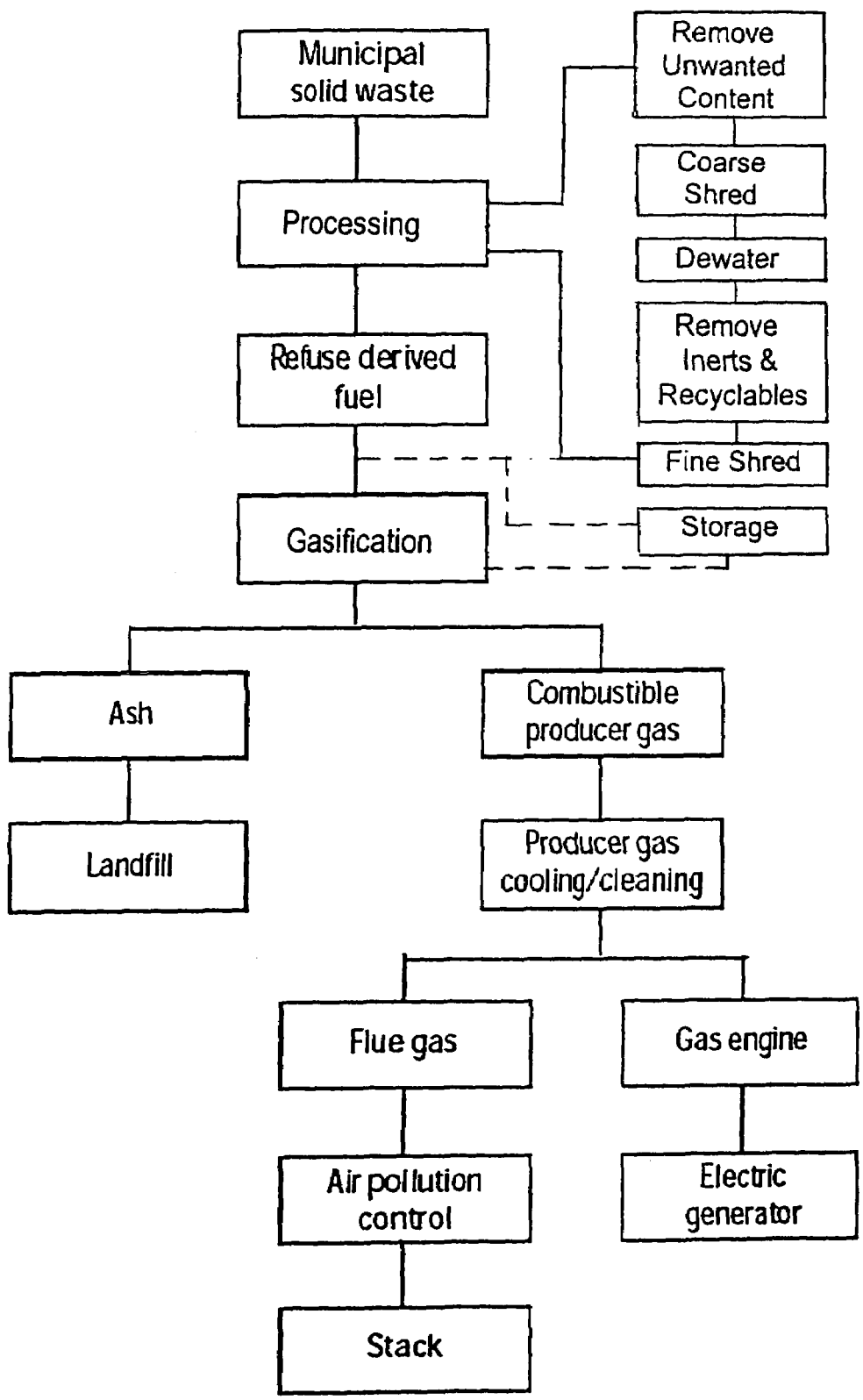
FIG. 5 is a process flow chart of another, preferred embodiment of this invention, featuring a two-step process for combusting the dewatered MSW.
Figure 6:
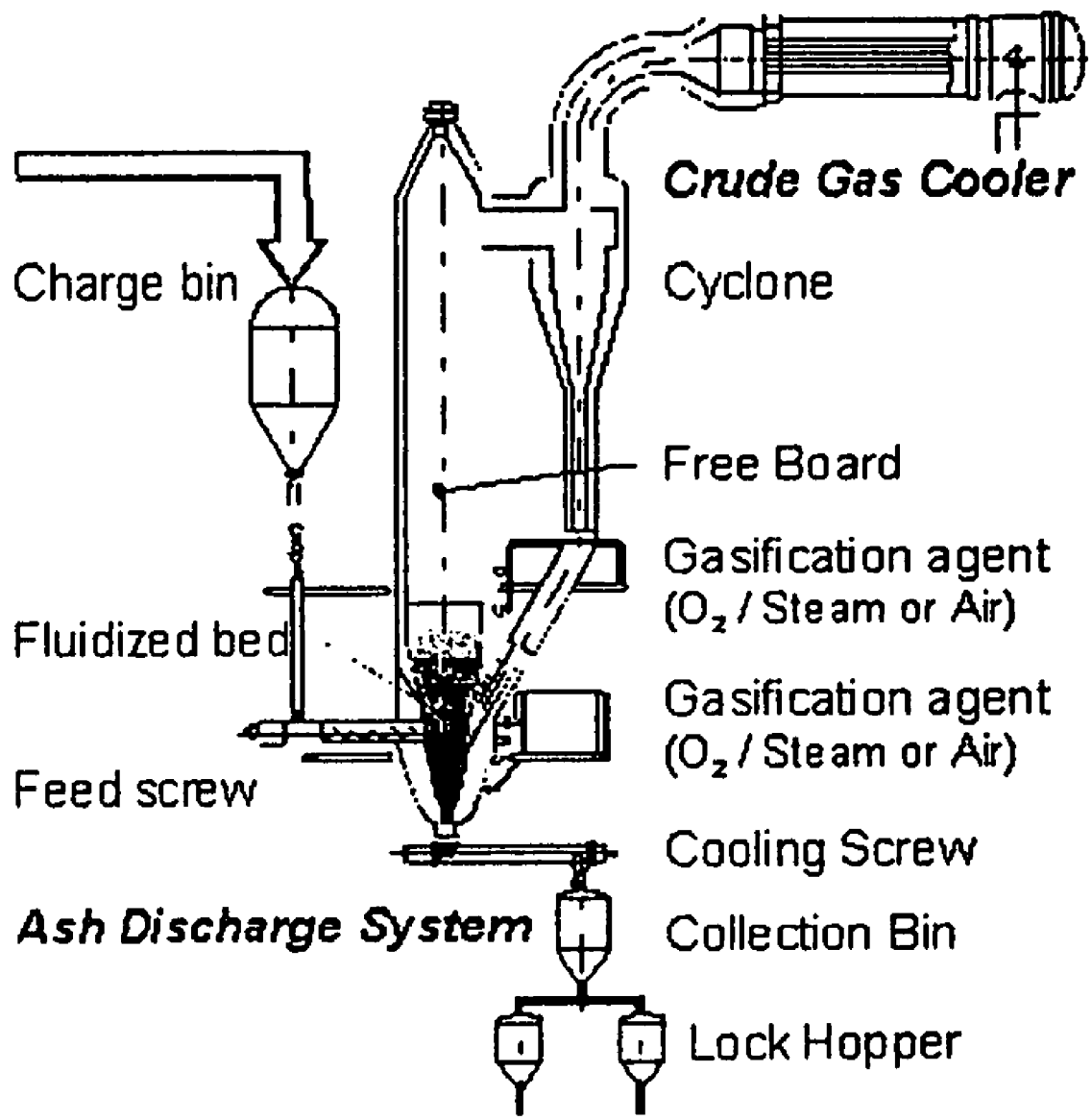
FIG. 6 is a schematic representation of a commercially-available gasification system, designed for wood chips, corn husks and other homogeneous organic waste materials that can be used in another, preferred embodiment of MSW disposal system of this invention.

This two-step, close coupled gasification process is shown in FIG. 5, while FIG. 6 schematically illustrates current gasification equipment that could be modified to process the dewatered MSW of this invention. As shown in FIG. 5, MSW is initially sorted to remove unwanted content, such as appliances, tires, metal cans and any other easily-identifiable and removable unwanted large items. The sorted residue is then coarsely chopped or shredded into pieces approximately 6" (15 cm) in size. The coarse-chopped material is then dewatered in the manner previously described in reference to FIGS. 1 and 3. This dewatered MSW is then sufficiently dry to enable a further sort to remove inerts, recyclables (metals, glass, etc.) and other remaining unwanted content.

Simply stated, the FIGS. 1-4 embodiment directly combusts the dewatered MSW by heating it in an oxygen-rich atmosphere (atmospheric air); this requires scrubbing the vapors (gaseous products) and disposing of any noxious solid residues of combustion. Gasification heats dewatered MSW in an oxygen-starved atmosphere to produce syngas, and then heats the syngas in an oxygen rich atmosphere at elevated temperature for complete combustion, thereby eliminating the need for scrubbing the vapors of combustion and eliminating noxious residues.

One example of equipment for gasification of biomass, which can be adapted to gasify the dewatered, conditioned MSW in this system, is illustrated in FIG. 6, and is made by Emery Energy Company, Salt Lake City, Utah USA. A gas-fired turbine for generating electricity is made by General Electric Co.

The MSW disposal processes and systems disclosed herein effectively dispose of MSW, and provide numerous advances over the present state of the art; they: (1) enable economic electric power generation, (2) reduce the need for sanitary landfills, (3) eliminate atmospheric pollution during dewatering, (4) reduce energy requirements to dewater the MSW, and (5) provide an economic benefit through the efficient use of generated steam to (a) preheat the drying air to speed the dewatering process, (b) provide electricity to power the process, and (c) supply electricity for sale.

While only preferred embodiments have been described and shown, obvious modifications are contemplated within the scope of this invention, as defined in the following claims.

We claim:

1. A method of processing municipal solid waste to maximize recovery of recyclable and inert waste components and to condition the remainder as fuel for combustion to produce energy, comprising the steps of:
   a. chopping the waste into pieces of a size suitable for handling, drying, separation and combustion,
   b. removing unwanted content from the waste,
   c. conveying the chopped waste through a drying chamber to reduce the moisture content of the waste to a predetermined amount to produce combustible dried waste, d. varying the rate of travel through the drying chamber based on the moisture content of the chopped waste entering the drying chamber, e. selectively varying the rate of travel of the waste through the drying chamber to produce the predetermined amount of moisture content, f. chopping the waste into lumps having a maximum size of about 2 inches (50 mm) to produce combustible dried waste, g. storing the combustible dried waste in a fuel storage bunker prior to combustion, and h. combusting the combustible dried waste to produce energy.

2. The method of claim 1, where at least a portion of the energy produced is electricity, for use in operating the process and for sale, and a portion is converted to heat, which is used in step c.

3. A method of processing municipal solid waste to maximize recovery of recyclable and inert waste components and to condition the remainder as fuel for combustion to produce energy, comprising the steps of:

a. removing identifiable unwanted components from the waste, b. chopping the waste into pieces of a size suitable for handling, drying, separation and combustion, c. conveying the chopped waste to a closed drying chamber, d. conveying the chopped waste through the closed drying chamber at a predetermined rate of travel, while reducing the moisture content of the waste to a predetermined amount in a closed air circulation system by passing warm dry air through the waste in the closed drying chamber to absorb moisture and produce moist air, removing the moist air from the closed drying chamber and conveying it to a dehumidification unit to dehumidify the moist air, slightly heating and conveying the slightly heated dehumidified air to the closed drying chamber, recycling the dehumidified air through the waste repeatedly in the closed system to produce dried waste without appreciably raising the temperature of the waste, and choosing the predetermined rate of travel based on the moisture content of the chopped waste entering the closed drying chamber so that the moisture content of the chopped waste reaches the predetermined amount when it exits the closed drying chamber as dried waste, e. removing recyclable and inert components from the dried waste to produce combustible dried waste, f. chopping the waste into lumps having a maximum size of about 2 inches (50 mm) to produce combustible dried waste, and g. combusting the combustible dried waste by first gasifying the combustible dried waste to produce a combustible syngas, and then combusting the syngas to produce energy.

4. The method of claim 3, wherein the usable energy is electricity.

5. The method of claim 3, wherein step e. is a close-coupled gasification of the dewatered MSW in which the gasification and combustion steps are performed sequentially without intermediate storage of the syngas.

6. The method of claim 3, wherein at least some of the energy produced is steam, and including the step of using the steam to preheat the dry air in step c. before entry into the drying chamber to enhance its ability to absorb moisture.

7. The method of claim 3, wherein at least some of the energy is steam, and including the step of using the steam to produce electricity.

8. The method of claim 3, wherein the method is continuous from step b. through step e., and including the step of storing the dried waste in a fuel storage bunker prior to gasifying the combustible dried waste in step g.

9. A system of processing municipal solid waste to maximize recovery of recyclable and inert waste components and to condition the remainder as fuel for combustion to produce energy, comprising means for removing unwanted content from the waste, first means for chopping the waste into pieces small enough for handling, drying, separation and combustion, means for conveying the chopped waste to a drying chamber, said drying chamber being a closed chamber for reducing the moisture content of the waste to produce dried waste, a closed air circulation system, including means for injecting dry air through the drying chamber to absorb moisture from the waste and produce dewatered waste, means for removing moist air from the drying chamber, and refrigeration cycle means for dehumidifying the air and recycling the dehumidified air back through the chamber, means for conveying the waste through the drying chamber at a predetermined rate of travel so that the dried waste attains a predetermined moisture content when it exits the drying chamber, means for varying the predetermined rate of travel of the waste through the drying chamber, means far removing the recyclable and inert components from the dried waste to produce combustible dried waste, second means for chopping the waste into lumps having a maximum size of about 2 inches (50 mm) to produce combustible dried waste, means for conveying the combustible dried waste to a gasifier, means for gasifying the combustible dried waste to produce combustible syngas, and means for combusting the syngas to produce usable energy.

10. The system of claim 9, wherein the calorific value of the produced combustible dried waste is approximately 15-18 MJ/kg.

11. The system of claim 9, wherein the energy is steam, and including a steam-powered electric generator for utilizing the steam to produce electricity.

12. The system of claim 11, including a heat exchanger for transferring heat from the steam to the dry air before it enters the drying chamber.

13. The system of claim 9, including means for storing the dried waste prior to gasification.

14. The system of claim 9, including means for feeding the combustible dried waste to the gasifier at a controlled rate.

* * * * *